United States Patent [19]

Hörpel et al.

[11] Patent Number: 4,965,326

[45] Date of Patent: Oct. 23, 1990

[54] PROCESS FOR DEACTIVATING POLYMERIZATION-INDUCING RADICALS

[75] Inventors: Gerhard Hörpel, Nottuln; Joachim Pangratz, Dorsten, both of Fed. Rep. of Germany

[73] Assignee: Bunawerke Hüls GmbH, Marl, Fed. Rep. of Germany

[21] Appl. No.: 410,460

[22] Filed: Sep. 21, 1989

[30] Foreign Application Priority Data

Oct. 28, 1988 [DE] Fed. Rep. of Germany ....... 3836777

[51] Int. Cl.$^5$ ............................................... C08F 2/42
[52] U.S. Cl. ........................................ 526/84; 526/82; 526/318.6; 526/340; 585/3; 252/182.18; 252/402; 252/404
[58] Field of Search ................... 526/84, 85, 211, 340, 526/240, 286, 82; 528/486, 487; 585/3; 252/182.18, 402, 404; 260/501.15, 502.6

[56] References Cited

U.S. PATENT DOCUMENTS

| | | | |
|---|---|---|---|
| 2,667,472 | 1/1954 | Brown | 526/84 |
| 2,817,648 | 12/1957 | Gould et al. | 526/85 |
| 3,060,158 | 10/1962 | Albert | 526/85 |
| 3,337,515 | 8/1967 | Heij et al. | 526/84 |

FOREIGN PATENT DOCUMENTS 2148185 4/1973 Fed. Rep. of Germany ........ 526/84

*Primary Examiner*—Joseph L. Schofer
*Assistant Examiner*—F. M. Teskin
*Attorney, Agent, or Firm*—Millen, White & Zelano

[57] ABSTRACT

Process for inhibiting and for stopping radical induced polymerizations which employs an aromatic hydroxy dithiocarboxylic acid or salt thereof as stopping agent for deactivating radicals, thereby precluding the formation of carcinogenic nitrosamines.

17 Claims, No Drawings

PROCESS FOR DEACTIVATING POLYMERIZATION-INDUCING RADICALS

BACKGROUND OF THE INVENTION

This invention relates to a process for deactivating radicals formed prior to or during induced polymerization of dienes and/or vinyl aromatic compounds and, optionally, additional monomers.

During the radical-induced polymerization of butadiene in an emulsion, premature gel formation occurs when conversions are relatively high. In order to counteract this effect, which has a disadvantageous impact on the properties of the final elastomer thus obtained, it is necessary to stop the polymerization before the conclusion of the reaction. With other radical-reduced polymerizations, it is often desirable to interrupt the reaction prior to completion. Alkali metal or ammonium dialkyl dithiocarbamate, frequently used in combination with other polymerization inhibitors, has been employed in the past as stopping agents (see, e.g., Houben-Weyl, Methoden der Organischen Chemie, Vol. 14, p. 433 ff.). For example, the stopping effect of sodium dimethyl dithiocarbamate can be improved considerably if sodium nitrite is added simultaneously. However, the use of dithiocarbamate entails the substantial drawback that in the course of the acid processing of the latex nitrosamines are formed which, according to present-day knowledge, must be considered a health hazard [see, e.g., Umschau 1985 (1), 24]. This risk is further increased if simultaneously sodium nitrite is employed. Accordingly, efforts have been made to select reaction conditions which, from the outset, preclude the formation of nitrosamines [see, e.g., Gummi, Asbest, Kunststoffe 39, 6 (1986)]. A similar problem arises if the undesired polymerization of radical-forming monomers is to be inhibited. For this purpose, as well, carcinogenic substances are frequently employed according to the state of the art, sometimes in appreciable quantities.

Amine-free polymerization inhibitors are known in principle. A summary is to be found, e.g., in the above-cited standard textbook by Houben-Weyl. However, those inhibitors suffer from the general disadvantage that the vulcanization rate of the rubbers thus obtained is clearly lower than that of comparable caoutchoucs stopped with the above mentioned system dimethyldithiocarhamate with or without sodium nitrite (see, e.g., U.S. Pat. No. 3,222,334).

OBJECTS OF THE INVENTION

Accordingly, it is an object of the present invention to provide a process for deactivating radicals formed prior to or during the radical-induced polymerization and which, on the one hand, precludes the formation of health hazardous nitrosamines and, on the other hand, does not adversely affect the vulcanization.

Other objects will be apparent to those skilled in the art to which this invention pertains.

SUMMARY OF THE INVENTION

In a process aspect, this invention resides in a process for stopping a polymerization with an effective amount of a stopping agent which is an aromatic hydroxy dithiocarboxylic acid or its salt, respectively, e.g., having the general Formula I

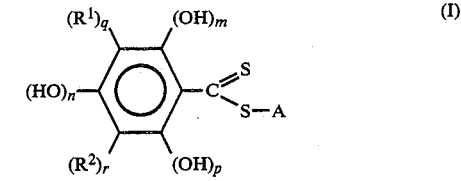

wherein m, n, p, q, and r each denote the integer 0 or 1, with the proviso that at least one of n, m, or p is 1;

$R^1$ and $R^2$, which can be alike or different, are moieties selected from the following classes:
  alkyl of 1 to 10 C atoms, preferably 1 to 6;
  alkenyl of 1 to 10 C atoms, preferably 1 to 4;
  aralkyl of up to 15 C atoms, preferable wherein the aryl group is carbocyclic, e.g., phenyl, and alkyl is of 1 to 4 carbon atoms which preferably forms a methylene bridge; and is an kation, e.g., hydrogen, ammonium, or preferably an alkali metal.

DETAILED DISCLOSURE

The process of the invention is particularly applicable to polymerizates obtained by radical-induced polymerization conducted as an aqueous emulsion and to those in which the monomer to be polymerized is a diene, e.g., butadiene, and/or an aralkene, e.g., styrene, e.g., a mixture of at least 10% by weight styrene; 10 to 90% by weight butadiene; and 0 to 10% by weight of another comonomer, e.g., of the general Formula II

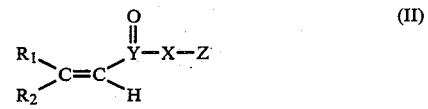

wherein $R_1$ and $R_2$ are alike or different and are hydrogen or a moiety of the formula $(CH_2)_n$—COOH, in which n is the numeral 0, 1 or 2; Y represents either sulfoxy (S=O) or preferably a carbon atom (C); X represents O or NH; and Z represents a hydrogen atom or, when X=O, alternatively, an alkali metal. Monomer mixtures of 20 to 40% by weight styrene and 80 to 60% by weight butadiene are preferred.

Of the compounds of Formula I, a sodium hydroxydithiocarboxylate of the Formula Ia

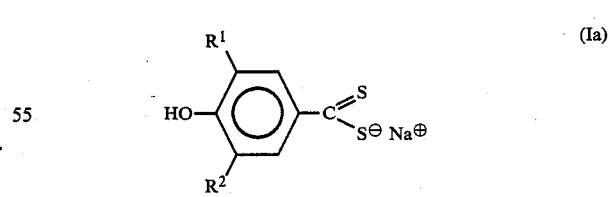

is preferably employed in which $R_1$ and $R_2$=alkyl, in particular t-butyl. The terminating agent is preferably employed in the form of a 1 to 10% aqueous solution thereof.

Examples of types of hydroxy dithiocarboxylic acid compounds which can be employed in this as stopping agents are those of Formula I, wherein:

(a) n is 1 and one or both of m and p is 0;
(b) n is 0 and one or both of m and p is 1;

(c) at least one and preferably both of r and q is 1, including those of (a) and (b), above;
(d) both r and q are 1 and $R^1$ and $R^2$ are alkyl, e.g., t-butyl, including those of (a) and (b), above;
(e) both r and q are 1 and $R^1$ and $R^2$ are aralkyl, preferably phen-lower-alkyl, e.g., benzyl, including those of (a) and (b), above;
(f) both r and q are 1 and $R^1$ and $R^2$ are alkenyl, e.g., ethenyl or allyl;
(g) A is H, including each of (a)–(f), above; and
(h) A is Na, including each of (a)–(f), above.

The dithiocarboxylic acids according to the invention contain no amine structure. Accordingly, the formation of nitrosamines is precluded. They not only effect an immediate and complete inhibition of the polymerization, they also ensure vulcanizing or vulcanizing product properties which can be compared with the properties of corresponding dithiocarbamate-stopped rubbers. Also, the hydroxy dithiocarboxylic acids and their derivatives employed in accordance with the invention are effective in substantially lower concentrations than conventional stopping agents (cf. Example 1.1 and Comparative Example C in Table 2).

The preparation of the dithiocarboxylic acids and their salts used in accordance with the invention normally proceeds by dithiocarboxylation of the corresponding phenols in dimethyl formamide or in an alcohol. A mixture of carbon disulphide and potassium hydroxide, as well as potassium dithiocarbonate or potassium trithiocarbonate, is suitable as a dithiocarboxylation agent. (See Scheithauer, R. Mayer in A. Senning: Topics in Sulfur Chemistry, Thio and Dithiocarboxylic Acids and Their Derivatives, Vol. 4, Georg Thieme Verlag, Stuttgart, 1979). The process according to the invention is generally applicable to all radical-induced polymerizations. With regard to the desired stopping effect, it is of no importance whether the polymerization proceeds batchwise or with a continuous feed.

Typical monomers or monomer mixtures for the manufacture of synthetic rubbers which may be employed in the polymerization include, for example, dienes, optionally in a mixture with copolymerizable monoolefins. Examples of suitable dienes are isoprene, chloroprene, cyano-butadiene-(1,3), 2-phenyl-butadiene, piperylene, 2,3-dimethylbutadiene-(1,3) and, in particular, butadiene-1,3. Examples of suitable copolymerizable mono-olefins are vinyl compounds substituted by at least one electronegative group, for example, aromatic vinyl compounds such as styrene, vinyl-naphthalene, alpha methyl-styrene, p-chloro-styrene, as well as acrylic acid, methacrylic acid, acrylonitrile, acrylamide, methacrylamide, the acrylates, the methacrylates, and others.

Emulsifying agents which can be employed in the case of the emulsion polymerizations include those conventionally employed, e.g., alkali metal soaps of optionally (de)hydrogenated fatty acids or abietic acid. However, other emulsifying agents conventionally employed in emulsion polymerization may also be used.

The persulphates, peroxides, hydroperoxides and azo compounds conventionally employed in radical-induced polymerization may be employed as polymerization starters, and these may moreover be optionally activated by a reducing agent by way of a redox initiation.

The temperature of the polymerization reaction is not critical. Conventionally, it is in the range of 0° C. to +90° C. The process according to the invention is generally carried out in such a manner that the polymerization batch is brought into contact with the stopping agent. It has been found appropriate not to add the stopping agent as such but instead in the form of an aqueous or organic solution. Aqueous emulsions are generally stopped with an aqueous 1 to 10% solution of the alkali metal or ammonium salt of the selected aromatic hydroxy dithiocarboxylic acid. Undesirable tendencies to coagulate may sometimes arise if the stopping agent is employed in too high a concentration.

The aromatic hydroxy dithiocarboxylic acid can also be employed as organic solutions and are then suitable for stopping polymerizations in both as in aqueous emulsion as well as in organic solution. The aromatic dithiocarboxylic acid is dissolved in as little as 0.5 to 9 times or more by volume of an organic solvent, such as, e.g., toluene, tetrahydrofuran or ethyl acetate. Styrene is a particularly suitable solvent.

The stopping agents are ordinarily employed in such an amount that approximately 0.1 to 1.0 parts hydroxy dithiocarboxylic acids or their salts are present in the polymerizate per 100 parts monomer.

Although it is possible in principle to add the stopping agent to the polymerization batch, the reverse procedure is preferred, i.e., the stopping agent is first introduced into the mixing area and the polymerization batch is then added thereto.

The aromatic hydroxy dithiocarboxylic acids and their salts can also be employed for inhibiting the polymerization of radical forming monomers. Monomers such as (meth)acrylates, dienes, vinyl esters and styrene are known to tend to the formation of radicals under the influence of light, oxygen or heat and to polymerize spontaneously. Although this tendency is less if the monomers are present in an inert organic solvent, radical induced polyaerizations may nevertheless occur spontaneously even in such solutions. In order to prevent this, the selected aromatic hydroxy dithiocarboxylic acids is preferably added to the monomer or monomer solution in amounts of about 10 to 1000 ppm, based on the monomers.

Contemplated equivalents of the process of this invention are those employing as the stopping agents an aromatic hydroxy dithiocarboxylic acid otherwise corresponding to Formula (I) wherein n, q and/or r each is 1 and $R^1$ and $R^2$ are another ring substituent, e.g., alkyl or aralkyl substituted with one or more simple noninterfering groups, e.g., hydroxy, carboxy, carbalkoxy, halo, etc.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications, if any, cited above and below, and of corresponding application German Pat. No. 38 36 777.7, filed Oct. 28, 1988, are hereby incorporated by reference.

EXAMPLES

I. POLYMERIZATIONS

EXAMPLE 1

Butadiene-styrene copolymerization product

A 12 l polymerization autoclave is fed with the substances according to Table 1 and thereafter agitated at 5° C. at a rate of 150 revolutions per minute (rpm). After 60% conversion has been attained, the polymerization batch is mixed with one of the stopping agents listed in Table 1. The determination of the conversion proceeds by taking a sample to which is admixed diethyl hydroxyl amine, the solution being evaporated down and the polymer content being determined gravimetrically. After 3 hours the polymerization conversion is determined by determining the solids content and this is linearly extrapolated for 60% conversion.

EXAMPLE 2

A 40 l polymerization autoclave is fed with the substances according to Table 1 and heated to 50° C. The start of the polymerization causes the batch to become heated to a reaction temperature of 80° C., which is maintained until a conversion of 60% has been attained. The polymerization batch is mixed with one of the stopping agents described in the following Table 1.

TABLE 1

Polymerization Formulations

| Polymerization Batch | Example 1 pphm[7] | Example 2 pphm[7] |
|---|---|---|
| Butadiene | 72 | 40 |
| Styrene | 28 | 60 |
| Acrylic acid | — | 5 |
| Water | 150 | 150 |
| Mersolat K 30 soap[0] | — | 0.5 |
| Sodium resin soap[1] | 4.9 | — |
| Polywachs 3000[2] | — | 0.004 |
| Sodium naphthalene sulphonate formaldehyde condensate[3] | 0.150 | — |
| Potassium chloride | 0.150 | — |
| EDTA[4] | 0.150 | 0.01 |
| Sodium hydroxide | 0.132 | — |
| Phosphoric acid | 0.066 | — |
| Sulphuric acid | 0.0018 | — |
| Sodium formaldehyde sulphoxylate[5] | 0.051 | — |
| t-dodecyl mercaptane | 0.18 | 0.75 |
| Pinane hydroperoxide[6] | 0.044 | — |
| Ammonium peroxide sulphate | — | 0.5 |

Footnotes of Table 1:
[1] A disproportionated abiatic acid (cf. Beyer "Lehrbuch der organischen Chemie", 8th edition, S. Hirzel Verlag, D-7000 Stuttgart, 1976, page 592) which is distributed under the trade name DRESINATE ® 731 by the firm Abieta, D-8900 Gersthofen.
[2] A polyethylene oxide, MG = 3,000, produced under the name polyethylene glycol 3000 by the firm Huls Aktiengesellschaft, D-4370 Marl.
[0] The soap, which comprehends a potassium salt of a paraffin sulfonate ($C_{16-18}$), is produced unter the name Mersolat[R] K 30 and distributed as a 39.5% aqueous solution by the firm BAYER AG, D-5090 Leverkusen.
[3] A naphthalene sulphonic acid, condensed with formaldehyde commercially available by the name VULTAMOL ® by the firm BASF AG, D-6700 Ludwigshafen.
[4] Diethylene diamine tetraacetic acid
[5] Sodium formaldehyde sulphoxylate is commercially available under the trade name BRUGGOLIT ® from the firm Bruggemann, D-7100 Heilbronn.
[6] A mixture of 1-, 2- and 5-hydroperoxo-7-dimethyl-2-methyl-bicyclo[3.1.1]hexane, which is commercially available as a 54% solution in pinane from the firm Hoechst AG, D-6230 Frankfurt 80.
[7] pphm = parts per hundred parts of monomer.

II. STOPPING OF THE POLYMERIZATION IN THE BATCH OBTAINED ACCORDING TO EXAMPLE 1.

On the attainment of a 60% conversion, the latex according to Example 1 is transferred to a reactor in which the stopping agent is present in dissolved form. The effect of the stopping agent is observed by the following determinations:

1. The effect of the stopping agent under thermal stress is determined, by way of
    (a) mixing the polymerization batch stopped at a conversion of 60% with an excess of diethyl hydroxyl amine, removing the remaining monomer and weighing the polymerization product, and
    (b) treating the polymerization batch stopped at a conversion of 60% for 8 hours at 60° C. and then, in the same manner as in (a), removing the monomer and weighing the polymerization product.

The difference between the two gravimetric determinations (delta FS), represents a measure of the stopping effect of the stopping agent employed.

2. A further method for determining the stopping effect is based on Mooney measurement.
    (a) The Mooney value $M_{before}$ of a freshly stopped polymerization batch having a conversion of 60% is determined.
    (b) A polymerization batch stopped in accordance with (a) is kept for 8 hours at 60° C., the monomer is removed and the Mooney value $M_{after}$ is determined.
    (c) The thermally stressed polymerization batch, freed of monomers according to (b), is kept for 1 week, 2 weeks, 3 weeks and 4 weeks, respectively, and then the Mooney value is determined in each case.

A latex is considered to be stable with respect to its Mooney viscosity ($ML_{1+4}$), if the differences are not more than 2 Mooney units.

Explanation of the stopping agents used:

DBCS-H: 4hydroxy-3,5-di-t-butyl benzene dithiocarboxylic acid

DBCS: Sodium salt of the 4-hydroxy-3,5-di-t-butyl benzene dithiocarboxylic acid

BECS: Sodium salt of 4-hydroxy-3,5-dibenzyl benzene dithiocarboxylic acid

DMCS: Sodium salt of the 4-hydroxy-3,5-dimethyl benzene dithiocarboxylic acid

TOCS: Sodium salt of the 4-methyl benzene dithiocarboxylic acid

DMC: Sodium dimethyl dithiocarbamate

DEHA: Diethyl hydroxyl amine

TABLE 2

Effect of different polymerization stopping agents on polymerization batch according to Example 1

| Example | Stopping agent* | Amount pphm | Delta FS % | $M_{before}$ | $M_{after}$ | $M_{1w}$ | $M_{2w}$ | $M_{3w}$ | $M_4$ |
|---|---|---|---|---|---|---|---|---|---|
| A[1] | TOCS | 0.451 | 3.6 | 55 | | | | | |
| 1.1 | DBCS | 0.050 | 0.3 | 36 | 35 | 35 | 35 | 36 | 35 |
| 1.2 | DBCS | 0.100 | 0.0 | 44 | 44 | 43 | 43 | 42 | 44 |
| 1.3 | DBCS-H | 0.100 | 0.0 | 57 | 54 | 53 | 55 | 54 | 53 |
| 1.4 | DBCS | 0.400 | 0.0 | 40 | 42 | 43 | 43 | 40 | 42 |
| 1.5 | DMCS | 0.193 | 0.0 | 50 | 50 | 48 | 48 | 47 | 49 |
| 1.6 | BECS | 0.200 | 0.3 | 48 | 46 | 47 | 47 | 47 | 47 |
| B | DMC | 0.190 | 1.2 | 59 | — | — | — | — | — |
| C | DMC | 0.300 | 0.8 | 48 | 49 | 50 | 51 | 54 | 53 |
| D | DMC | 0.393 | 0.3 | 51 | 50 | 52 | 51 | 51 | 52 |
| E | DMC/NaNO$_2$ | 0.39/0.06 | 0.0 | 50 | 50 | 50 | 48 | 51 | 49 |
| F | DEHA | 0.80 | 0.2 | 47 | 48 | 47 | 49 | 51 | 56 |

*Except in Example 1.3, in which a solution in styrene was used, the stopping agents are employed as aqueous solutions;
pphm: Parts per hundred parts of starting monomer;
Delta FS: solids increase in % after thermal stressing as a measure of continued polymerization;
$M_{before}$: Mooney viscosity immediately after stopping the polymerization;
$M_{after}$: Mooney viscosity after thermal stressing and removal of monomer;
$M_{1w, 2w, \ldots}$: Mooney viscosity of a latex stored at 60° C. after 1 week, 2 weeks, ...
[1]The values $M_{after}$ and $M_{1w}$ etc. were not determined.

III. STOPPING OF THE POLYMERIZATION IN THE BATCH OBTAINED ACCORDING TO EXAMPLE 2

On attainment of 60% conversion, samples of polymerization batch were transferred into gastight flasks, which either lacked or which contained a stopping agent, as set forth on Table 3. The samples were left standing for 3 days at room temperature and then evaluated by comparison with control samples which did not contain stopping agent.

TABLE 3

Effect of different stopping agents on the polymerization batch according to Example 2

| Example | Stopping Agent | Amount ppm | Delta FS % |
|---|---|---|---|
| G | — | — | 3.2 |
| H | — | — | 3.3 |
| 2.1 | DBCS-H | 0.6 | 0.0 |
| 2.2 | DBCS-H | 0.2 | 0.1 |
| I | DEHA | 0.3 | 0.7 |
| K | DEHA | 5.0 | 0.0 |

IV. VULCANIZATION OF THE STOPPED POLYMERIZATION PRODUCT OBTAINED ACCORDING TO EXAMPLE 1

After stopping the polymerization, the latex obtained according to Example 1, freed of residual monomers, is processed after electrolyte precipitation (see Houben-Weyl, Vol. 14/1, page 480) and the isolated caoutchouc thus-obtained is rolled at 50° C. according to the following prescription and vulcanized at 160° C.

| Caoutchouc | 100 phr (parts per hundred rubber) |
|---|---|
| CORAX ® | 50 phr |
| Zinc oxide | 3 phr |
| Stearic acid | 1 phr |
| VULKAZIT ® NZ | 1 phr |
| Sulphur | 1.75 phr |

CORAX ® N 330 is a carbon black marketed by Degussa AG, d-6450 Hanau.
VULKAZIT ® NZ is a valcanizing agent having the chemical detonation benzothiazyl-2-tert-butyl sulfene amide, marketed by the firm Bayer AG, D-5090 Leverkusen.

TABLE 4

Vulcanizing and vulcanized product properties of the stopped polymers

| Example | $M_R$ | $M_{Mi}$ | $t_{10}$ min. | Delta t | Heat min. | F MPa | D % | Module 200 | Module 300 | H | E % |
|---|---|---|---|---|---|---|---|---|---|---|---|
| 1.4 | 44 | 81 | 4.1 | 10.1 | 30 | 21.4 | 367 | 8.5 | 16.3 | 70 | 46 |
| | | | | | 45 | 20.9 | 351 | 8.8 | 16.7 | 69 | 47 |
| 1.2 | 46 | 83 | 4.7 | 11.1 | 30 | 24.9 | 429 | 8.3 | 15.7 | 69 | 46 |
| | | | | | 45 | 25.6 | 435 | 8.5 | 16.2 | 70 | 46 |
| E | 52 | 86 | 4.9 | 10.2 | 30 | 25.7 | 423 | 8.5 | 16.3 | 70 | 47 |
| | | | | | 45 | 24.2 | 389 | 9.1 | 17.2 | 70 | 47 |
| D | 61 | 86 | 5.0 | 12.6 | 30 | 23.8 | 395 | 8.5 | 16.6 | 68 | 42 |
| | | | | | 45 | 26.1 | 398 | 9.6 | 18.2 | 69 | 42 |
| F | 51 | 86 | 4.8 | 11.8 | 30 | 21.7 | 371 | 8.3 | 15.5 | 70 | 46 |

TABLE 4-continued

| | | | | | Heat | F | D | Module | | | E |
|---|---|---|---|---|---|---|---|---|---|---|---|
| Example | $M_R$ | $M_{Mf}$ | $t_{10}$ min. | Delta t | min. | MPa | % | 200 | 300 | H | % |
| | | | | | 45 | 17.5 | 310 | 8.6 | 16.7 | 70 | 46 |

Explanation for Table 4:
$M_R$: Raw Mooney, Mooney value of the pure caoutchouc sheet according to ASTM D 1646
$M_{Mf}$: Mooney value of the vulcanization product
$t_{10}$: Time in minutes at which 10% of the caoutchouc has been vulcanized, vulcametry according to DIN 53 529
$t_{90}$: Time in minutes at which 90% of the caoutchouc has been vulcanized, vulcametry according to DIN 53 529
Delta t: $t_{90}-T_{10}$ in minutes
F: tensile strength in Mpa according to DIN 53 504
D: yield extension in % according to DIN 53 504
Module: at 200% and 300% stretching according to DIN 53 504
H: Shore A hardness at room temperature according to DIN 53 505
E: Rebound elasticity at room temperature according to ISO R 1767

EXAMPLE 3

100 g styrene containing 0.4 pphm DBCS were exposed at room temperature to daylight. After 1 day, 2, 5, 10 and 25 days, tests were conducted for polystyrene by precipitation of an aliquot in methanol. Even after 25 days no polystyrene could be detected by gel chromatography.

COMPARATIVE EXAMPLE L 100 g styrene were exposed at room temperature to daylight. After only 2 days was it possible to precipitate polystyrene (0.7 g) from a 1 g aliquot.

Following the procedure of Examples 1.2 and 3, comparable results are achieved by substituting as the stopping agent a like polymerization stopping amount of one of the following hydroxy dithiocarboxylic acid compounds (as the sodium salt): Substituents of benzene-dithiocarboxylic acids:
4-hydroxy-
4-hydroxy-3-t-butyl-
4-hydroxy-3,5-di-nonyl-
4-hydroxy-3,5-di-benzyl-
4-hydroxy-3,5-di-styryl-
2,4-hydroxy-3,5-di-allyl-
2,4-dihydroxy-3-t-butyl-
2,4-dihydroxy-3,5-dimethyl-
2,6-dihydroxy-3,5-dialkyl- is less likely.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for deactivating polymerization inducing radicals formed prior to or during a radical-induced polymerization which comprises contacting a radical-forming monomer or mixture of radical-forming monomers or a polymerization batch comprising same with a stopping agent which is an aromatic hydroxy compound of the general formula

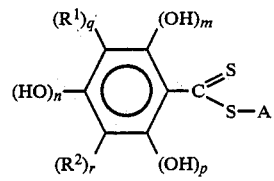

wherein
m, n, p, q and r each are the integer 0 and 1, with the proviso that at least one of m, n, and p is 1;
$R^1$ and $R^2$ each are selected from the group consisting of alkyl of 1 to 10 carbon atoms, alkenyl of 1 to 10 carbon atoms, and aralkyl of up to 15 carbon atoms; and
A is hydrogen, ammonium or alkali metal.

2. A process according to claim 1, wherein the stopping agent is added to a radical-induced polymerizate.

3. A process according to claim 2, wherein the polymerizate is in the form of an aqueous emulsion.

4. A process according to claim 1, wherein the radical-induced polymerizate is produced from a monomer mixture comprising styrene and butadiene.

5. A process according to claim 4, wherein the monomer mixture comprises at least 10% by styrene;
10 to 90% by weight butadiene; and
0 to 10% by weight of a further comonomer.

6. A process according to claim 5, wherein the monomer mixture comprises a further comonomer of the general formula

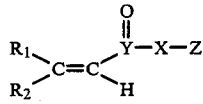

where $R_1$ and $R_2$=H or $-(CH_2)_n$-COOH in which n is the integer 0, 1 or 2; Y=C or S=); and X=O and Z=H or an alkali metal or X=NH and Z=H.

7. A process according to claim 6, wherein the further comonomer is acrylic acid.

8. A process according to claim 5, wherein the monomer mixture is a mixture of 20 to 40% by weight styrene and 80 to 60% by weight butadiene.

9. A process according to claim 1, wherein n=q=r=1, m=p=0 and A is sodium.

10. A process according to claim 9, wherein $R^1$ and $R^2$ each are alkyl of 1 to 10 carbon atoms.

11. A process according to claim 10, wherein $R^1$ and $R^2$ are tert.-butyl.

12. A process according to claim 5, wherein the stopping agent is employed in the form of a 1 to 10% aqueous solution.

13. A process for terminating with a stopping agent polymerization in an incomplete polymerized polymerizate obtained by the radical-induced polymerization of a monomeric mixture of a diene, a vinyl aromatic and optionally another comonomer, which comprises injecting the polymerizate into an aqueous solution of a polymerization terminating amount of a compound of the formula

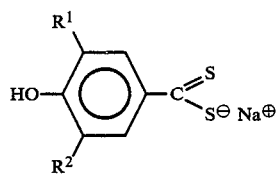

wherein $R^1$ and $R^2$ are alkyl of 1 to 6 carbon atoms.

14. A process according to claim 13, where $R^1$ and $R^2$ are tert.-butyl.

15. A method of inhibiting the autopolymerization of a radical-forming monomer which comprises mixing with the monomer an effective amount of an aromatic hydroxy compound of the general formula

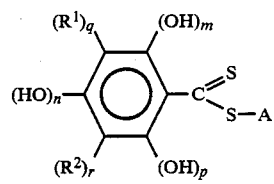

wherein m, n, p, q and r each are the integer 0 or 1, with the proviso that at least one of m n, and p is 1;

$R^1$ and $R^2$ each are selected from the group consisting of alkyl of 1 to 10 carbon atoms, alkenyl of 1 to 10 carbon atoms, and aralkyl of up to 15 carbon atoms; and A is hydrogen, ammonium or alkali metal.

16. A method according to claim 15, wherein the monomer is styrene and the aromatic hydroxy compound is a compound of the formula

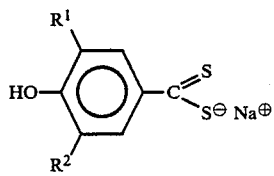

wherein $R^1$ and $R^2$ are alkyl of 1 to 6 carbon atoms.

17. A method according to claim 16, where $R^1$ and $R^2$ are tert.-butyl.

* * * * *